United States Patent [19]

Whitehurst et al.

[11] Patent Number: 5,401,393
[45] Date of Patent: Mar. 28, 1995

[54] REACTIVE ADSORBENT AND METHOD FOR REMOVING MERCURY FROM HYDROCARBON FLUIDS

[75] Inventors: Darrell D. Whitehurst, Titusville, N.J.; Tsoung Y. Yan, Philadelphia, Pa.

[73] Assignee: Mobil Oil Corporation, Fairfax, Va.

[21] Appl. No.: 120,505

[22] Filed: Sep. 14, 1993

[51] Int. Cl.$^6$ .............................................. C10G 17/00
[52] U.S. Cl. .................................. 208/251 R; 502/402
[58] Field of Search ................... 208/251 R; 502/400, 502/401, 402

[56] References Cited

U.S. PATENT DOCUMENTS

| | | |
|---|---|---|
| 2,860,952 | 11/1958 | Bergeron et al. . |
| 3,194,629 | 7/1965 | Dreibelbis et al. . |
| 3,674,428 | 7/1972 | Dean et al. . |
| 3,749,761 | 7/1973 | Dean et al. . |
| 3,755,161 | 8/1973 | Yokota et al. . |
| 3,785,968 | 1/1974 | Whitehurst et al. . |
| 3,790,370 | 2/1974 | Lalancette . |
| 3,847,598 | 11/1974 | Coulter . |
| 4,044,098 | 8/1977 | Miller et al. . |
| 4,053,401 | 10/1977 | Fukushima et al. . |
| 4,094,777 | 6/1978 | Sugier et al. . |
| 4,101,631 | 7/1978 | Ambrosini et al. . |
| 4,147,626 | 4/1979 | Findlay et al. . |
| 4,419,107 | 12/1983 | Roydhouse . |
| 4,474,896 | 10/1984 | Chao . |
| 4,764,219 | 8/1988 | Yan . |
| 4,909,926 | 3/1990 | Yan . |
| 4,946,596 | 8/1990 | Furuta et al. . |
| 4,962,276 | 10/1990 | Yan . |
| 4,966,683 | 10/1990 | Audeh . |
| 5,053,209 | 10/1991 | Yan . |
| 5,080,799 | 1/1992 | Yan . |

FOREIGN PATENT DOCUMENTS 2310795  12/1976  France .

Primary Examiner—Helen M. S. Sneed
Assistant Examiner—Bekir L. Yildirim
Attorney, Agent, or Firm—A. J. McKillop; M. D. Keen

[57] ABSTRACT

A method is disclosed for synthesizing a reactive sulfur-containing adsorbent material for removing metals, preferably mercury, from hydrocarbon fluids. The method includes impregnating a porous polystyrene resin with elemental sulfur, and heating the impregnated resin/sulfur mixture to chemically fix the sulfur to the resin. The elemental sulfur may be in solid, liquid, or vapor phase under conditions of contact with the resin. Also disclosed is the reactive adsorbent synthesized by this method. Also, a process is disclosed for removing mercury from hydrocarbon fluids by using a reactive adsorbent of the invention.

9 Claims, No Drawings

REACTIVE ADSORBENT AND METHOD FOR REMOVING MERCURY FROM HYDROCARBON FLUIDS

BACKGROUND OF THE INVENTION

The invention relates to a new adsorbent for the removal of metal contaminants from liquid and gaseous fluids, particularly hydrocarbon oils.

Typical crude oils may contain about 0.5 to 10 parts per billion (ppb) of mercury. Higher levels of mercury are often found in hydrocarbon condensates from natural gas production. Concentrations of between 50 and 300 ppb are commonly present in the condensates from some fields, but in condensates from certain fields can exceed 1000 ppb.

The heavy condensate produced from some fields contains about twenty percent $C_{10}$ and higher hydrocarbons, and about five percent $C_{20}$ and higher hydrocarbons. Typical crudes which often contain mercury are much heavier than the condensate, and can contain up to eighty percent $C_{20}$ and higher hydrocarbons. When adsorbents are used to adsorb mercury directly, the non-selective adsorption of the heavy hydrocarbons competes too favorably with the mercury leading to low mercury adsorption capacity.

High levels of mercury in hydrocarbon liquids, crude oil, and condensates can cause problems in processing due to the corrosive effect of mercury on vital equipment such as cryogenic heat exchangers. Such heat exchangers are often made from aluminum which forms an amalgam with mercury. Other equipment can also be corroded by mercury. In addition, mercury can poison catalysts used to convert hydrocarbons to other organic compounds. Furthermore upon combustion, the mercury in hydrocarbon products is released into the air, causing environmental concerns.

A number of methods have been developed for removing mercury from gases and liquids. U.S. Pat. Nos. 4,094,777, 4,101,631, 4,419,107, 4,474,896, 4,909,926 and 4,946,596, and French Publication No. 2 310 795 disclose several such methods. For example, U.S. Pat. No. 4,094,777 and the French publication both employ a metal or metal compound supported by an adsorbent mass such as alumina or silica-alumina. U.S. Pat. No. 4,094,777 describes the use of copper sulfide (CuS) within the adsorbent mass, while the French publication indicates that the preferred metals are silver or a mixture of silver with gold, nickel or copper. U.S. Pat. No. 4,101,631 discloses a process that includes passing a mercury-containing gas stream through a sorption zone containing a crystalline zeolitic molecular sieve having elemental sulfur loaded thereon. U.S. Pat. No. 4,909,926 describes the use of CuS as an adsorbent at temperatures of about 450° F. In this patent, mercury levels were reduced from about 200 ppb to below 10 ppb.

U.S. Pat. No. 4,474,896 discloses polysulfide adsorbents for mercury removal. These adsorbents employ any of a variety of support materials including ion exchange resins and zeolites. The adsorbents also include, as an essential component of the adsorbent complex, a metal ion bridging between the support and the sulfide. U.S. Pat. No. 4,496,596 also discloses adsorbents comprising metal sulfides on support materials.

U.S. Pat. 3,785,968 (hereinafter the "'968 patent") discloses the use of sulfur chemically bound to relatively low surface area polystyrene for heavy metals removal from hydrocarbon streams, specifically the removal of lead (Pb) from motor fuels. The '968 patent also discloses a method to produce these sulfur-polystyrene resin sorbents (hereinafter "S/resins") in which sulfur is dissolved in a high boiling solvent, such as a multi-chlorinated benzene, and the resin to be treated is suspended in the solvent while heating to elevated temperatures (170° C.–220° C.). The polystyrene resin employed by the '968 patent has a relatively low surface area, i.e., about 100 $m^2/g$.

The '968 patent provides no description of the utility of higher temperatures in the metals removal processes for rendering the process practical. The '968 patent also provides no indication that there would be an optimum level of sulfur content in the S/resin for maximum activity and/or capacity. In addition, the '968 patent provides no indication of the potential use of resins having higher surface areas, such as those unexpectedly found to be highly useful according to the invention.

Therefore, in order to overcome the disadvantages inherent in the prior art, it is a purpose of the invention to provide an economical process for effectively reducing metal contaminants, especially mercury, from hydrocarbon fluids to the low levels required for process equipment and environmental control.

It is also a goal of the invention to provide an environmentally sound process for metals depletion from hydrocarbon fluids.

Another purpose of the invention is to provide an improved metals removal process which can be readily integrated into existing processing systems.

It is still another purpose of the invention to provide an improved adsorbent for the depletion of metals, preferably mercury, from hydrocarbon fluids, which can be readily integrated into existing processing systems.

Yet another purpose of the invention is to provide a method for making an improved adsorbent for the removal of metals from hydrocarbon fluids.

SUMMARY OF THE INVENTION

These and other purposes and goals are achieved by the present invention which provides an adsorbent and process for the depletion of metal contaminants, especially mercury, from liquid and gaseous fluids such as natural gas condensates and hydrocarbon oils.

An improved method is provided for synthesizing a sulfur-containing sorbent for depleting metals, preferably mercury, from hydrocarbon fluids. The new method includes the steps of impregnating a porous polystyrene resin with elemental sulfur, using either gaseous sulfur vapors, sulfur dissolved in an easily removable solvent, such as carbon disulfide, or mixed sulfur powder; baking the impregnated resin/sulfur mixture at a temperature between about 120° C. and about 300° C. for a time sufficient to chemically fix the sulfur within the resin pore system; and, optionally, washing the sorbent to remove any non-bound sulfur. The polystyrene resin has a surface area of at least 50 $m^2/g$, preferably at least 100 $m^2/g$, and more preferably at least 200 $m^2/g$.

The improved adsorbent synthesized by this method is also provided, which demonstrates superior properties for the depletion of metal contaminants, preferably mercury, from hydrocarbons. The adsorbent contains between about 10 wt. % and about 30 wt. % sulfur, preferably between about 15 wt. % and about 20 wt. % sulfur.

In addition, an improved process is provided for the selective adsorption of metal contaminants, preferably mercury, which includes the steps of providing a relatively high surface area support having an adsorbent thereon, passing a metal-containing fluid into contact with the adsorbent, and maintaining the temperature of the adsorbent within an optimum range, depending upon the feed, to improve the adsorption rate and minimize non-selective adsorption.

For the removal of heavy metals, such as mercury, from hydrocarbon streams it has been found that elevated temperatures are far superior to ambient temperature. Typically, temperatures of from about 60° C. to about 300° C. are preferred. Greater than 90% of the metal compounds can be removed using a balance of flow rate and temperature of the sorbent bed.

A better understanding of these and other purposes, features, and advantages of this invention is provided in the following detailed description of illustrated embodiments thereof, the scope of which is defined in the appended claims.

DETAILED DESCRIPTION OF THE INVENTION

The invention is directed to a practical and economical adsorbent, a method of its preparation, and a process for its use in reducing the level of metal contaminants, preferably mercury, in hydrocarbon fluids to acceptable levels, i.e., in the range of from about 1 ppb to about 20 ppb.

An improved method is provided for synthesizing a sulfur-containing sorbent for depleting metals, preferably mercury, from hydrocarbon fluids, such as natural gas condensates and hydrocarbon oils. The new method includes the steps of impregnating a porous polystyrene resin with elemental sulfur, using either gaseous sulfur vapors, sulfur dissolved in an easily removable solvent, such as carbon disulfide, or mixed sulfur powder; baking the impregnated resin/sulfur mixture at a temperature between about 120° C. and about 300° C. for a time sufficient to chemically fix the sulfur within the resin pore system; and, optionally, washing the sorbent to remove any non-bound sulfur. The polystyrene resin has a surface area of at least 50 $m^2/g$ preferably at least 100 $m^2/g$, and more preferably at least 200 $m^2/g$.

The improved adsorbent synthesized by this method is also provided, which demonstrates superior properties for the depletion of metal contaminants, preferably mercury, from hydrocarbons. The adsorbent contains between about 5 wt. % and about 30 wt. % sulfur, preferably between about 10 wt. % and about 20 wt. % sulfur.

In addition, an improved process is provided for the selective adsorption of metal contaminants, preferably mercury, which includes the steps of providing a relatively high surface area support having an adsorbent thereon, passing a metal-containing fluid into contact with the adsorbent, and maintaining the temperature of the adsorbent within an optimum range, depending upon the feed, to improve the adsorption rate and minimize non-selective adsorption.

The present invention provides a substantially more economical process for producing the desired sorbent, as large volumes of high boiling expensive solvents are not required. The cleanup of the S/resin product is also much more facile.

Mercury in hydrocarbon fluids can be reduced to very low levels if an adsorbent is used to react with mercury to form insoluble compounds. In contrast to physical adsorption, it has been found that the rate of reactive adsorption is enhanced by increasing the reaction temperature. High temperatures have been found to not only improve the adsorption rate but also increase the adsorption capacity, in contrast to common wisdom. It has been discovered that at higher temperature, the non-selective adsorption of heavy hydrocarbons is minimized, and more active sites accordingly remain available on the adsorbent for mercury adsorption. Thus, high temperature adsorption leads to higher levels of mercury removal as well as higher adsorption capacity for the adsorbents.

The process for treating condensate can be advantageously integrated within existing refineries. The desirable temperature and pressure conditions for the process are similar to those found to exist in stabilizers, which are commonly positioned in refinery process streams before the condensates pass to heat exchangers. A reactor filled with the reactive adsorbent may accordingly be positioned in a flow stream between the stabilizer and the heat exchanger.

Mercury within the hydrocarbon oil is removed by passing it through a reactor filled with adsorbent. The process can be conducted using a hydrocarbon fluid having any of various physical phases, including vapor, vapor/liquid or liquid phase. Homogeneous liquid or vapor phase is preferred, to avoid maldistribution of the feed in the adsorption bed. Liquid phase operation is preferred for processing heavy hydrocarbon condensates. In this case, the unit pressure is maintained at a high enough level to ensure liquid phase operation at high temperature. A pressure of at least about 10 psi is maintained for the processing of liquid condensate. The process may be carried out in the presence of other gases such as light hydrocarbons ($C_1$–$C_6$), $H_2$, $H_2S$, $N_2$, $H_2O$, $CO_2$, and mixtures thereof.

The sulfur-modified, cross-linked polystyrene composition of this invention is suitably prepared by reacting a cross-linked polystyrene resin, preferably intrinsically porous with elemental sulfur at a temperature in the approximate range of 100° C. to 300° C. The resultant solid, after removal of any solvent that is used, and after extraction of any unreacted sulfur, contains a substantial quantity, generally between about 2 wt. % and about 30 wt. % and preferably between about 5 wt. % and about 15 wt. %, of chemically bound sulfur.

The polystyrene resin is preferably a solid, cross-linked, intrinsically porous material. It may be a copolymer of styrene with any of a number of co-monomers, for example, vinyl pyridine, acrylic derivatives, or substituted styrenes. The cross-linking agents may be any of those commonly used in commercial practices, for example, divinyl aromatics, acrylic esters, or other diolefins.

The polystyrene resin is preferably in the form of beads. The beads may have diameters of from about 0.1 mm to about 3 mm, preferably from about 0.3 mm to about 2 mm.

The polystyrene resin, as previously mentioned, is intrinsically porous. Such resins are termed "macroporous" or "macroreticular" resins. Because of this porosity the surface area of the resin per unit of weight is greater than that of solid beads of gel type resin of similar diameter. The porosity of the resin is conventionally expressed as a function of surface area, typically $m^2/g$ (meters$^2$/gram). The resins useful for the adsorbent and method of the invention have surface areas of at least about 50 m$^2$/g, preferably at least about 100 m$^2$/g, more preferably 200 m$^2$/g or greater. A highly preferred polystyrene resin is the macroreticular polystyrene resin having 700 m$^2$/g surface area, available as Amberlite XAD-4, manufactured by Rohm and Haas, of Philadelphia, Pa.

In one embodiment of the invention, the reaction of the polystyrene resin with elemental sulfur may be carried out in the presence of a solvent. The solvent is preferably substantially inert under conditions of preparing the reactive adsorbents of the invention. Suitable solvents include halogenated hydrocarbon solvents, such as chlorinated aromatic or chlorinated aliphatic compounds. Such solvents include, for example, chlorobenzene, ortho-, meta-, or paradichlorobenzene, any trichlorobenzene isomer, α-chloronaphthalene, 2,2'-dichlorobiphenyl, 1,1,2,2-tetrachloroethane, hexachlorocyclohexane, and pentachlorocyclopentane. Reaction takes place at an elevated temperature, generally the reflux temperature of the particular solvent employed. The desired extent of reaction is usually complete after about 2 to about 120 hours, preferably between about 2 and about 40 hours, most preferably from about 5 hours to about 20 hours.

The weight proportion of polystyrene resin to sulfur is generally in the range of 10:1 to 1:10. The reaction may be conducted in air, but is suitably carried out in an inert atmosphere, such as helium, argon, nitrogen, carbon dioxide, hydrogen sulfide, or carbon monoxide.

After the reaction is completed, the solvent is removed from the solid reaction product by any suitable means such as filtration, centrifuging, or other means of separation. Any unreacted sulfur may be extracted by washing with a suitable solvent such as carbon disulfide, sulfur dioxide, liquid ammonia, aromatic hydrocarbons, halogenated hydrocarbons, such as dichloromethane, Freon, diiodomethane or chlorinated aromatics.

In an alternative embodiment, a reaction of elemental sulfur with the polystyrene resin may be performed in which a powdered form of elemental sulfur is mixed with the dry resin, and the mixture is heated at a temperature of from about 100° C. to about 400°, preferably from about 120° C. to about 300° C., and for a period of from about 1 hour to about 40 hours, preferably from about 2 hours to about 20 hours. In this method of preparation, the reaction is performed under an atmosphere of an inert gas such as $CO_2$ or $N_2$. The reaction is atmosphere of an inert gas such as $CO_2$ or $N_2$. The reaction is preferably performed under a flowing atmosphere of nitrogen gas.

In another embodiment, S/resins in accordance with the invention may be prepared by exposing a polystyrene resin to a solution of elemental sulfur, evaporating the solvent, usually by heat and/or agitation, and heating the dried sulfur-contacted resin at a temperature sufficient to cause the S/resin to form. It is believed that, by using a solvent to dissolve the sulfur prior to contact with the resin, the sulfur is distributed more evenly on the resin. The solvent used in this embodiment must be capable of dissolving elemental sulfur. Generally the solvent may be chosen from among the solvents listed above, and preferably the solvent is $CS_2$. The solvent is evaporated at a temperature sufficient to drive off the solvent, and is selected, depending on the solvent, from between about ambient temperature and about 150° C. If $CS_2$ is the solvent, the evaporation temperature is preferably between about ambient temperature and about 80° C., under an inert atmosphere such as $CO_2$ or $N_2$. The reaction conditions for binding the sulfur to the resin are generally similar to those employed when the reaction is performed using powdered sulfur, as described above.

The sulfur-modified resin prepared according to the method of the invention may contain up to about 30% by weight of sulfur, depending on the reaction conditions used. For purposes of removing metals such as mercury from hydrocarbon fluids, the S/resin has a sulfur content of from about 5% by weight (wt. %) to about 30 wt. %, preferably from about 10 wt. % to about 20 wt. %.

The resulting sulfur-modified, cross-linked polystyrene resin may be employed for removing heavy metal contaminants as described above. The S/resins are capable of removing such heavy metals as: cobalt, iron, nickel, rhodium, platinum, palladium, lead, manganese, copper, mercury, gold, silver, iridium, cadmium, thallium, and mixtures thereof. In some instances and circumstances, it is contemplated that the above metals, particularly precious metals, may be economically recovered by burning off the resin sorbent.

The reaction temperature of the mercury adsorption process is most critical for a long operation life. The workable temperature range appears to be in the range of from about 100° C. to about 200° C. At low temperature, the life of the adsorbent before mercury breakthrough is short because impurities compete too well for adsorption. As a result, the reactivity with the metals is too low at lower temperatures, leading to a long mass transfer zone and a low adsorption capacity. At temperatures above 200° C. it appears that leaching and/or degradation of the adsorbent occurs, even though the adsorbent remains extraordinarily effective at removing mercury from the feed stream.

The following Examples further illustrate the various features of the invention, and are not intended in any way to limit the scope of the invention, which is defined in the appended claims.

Mercury content was evaluated by use of a gold film mercury vapor analyzer (Model 301, manufactured by Jerome Instrument Corporation, located in Jerome, Ariz.). All mercury values described in these Examples were obtained using this instrument, which is capable of detecting mercury in concentrations as low as 0.1 ppb.

EXAMPLE 1

Following the procedure of Example 3 described in U.S. Pat. No. 3,785,968, an S/resin was prepared using a high surface area macroreticular polystyrene polymer (Amberlite XAD-4, manufactured by Rohm and Haas). This polymer had a surface area of 700 m$^2$/gm, as compared to the polymer used in U.S. Pat. 3,785,968, which had a surface area of only 100 m$^2$/gm. The washed and dried polymer (50.5 g) was placed in a 2 liter vessel along with 750 cc of 1,2,4-trichlorobenzene and 115 g of elemental sulfur. The mixture was heated to reflux (220° C.) for 7 hrs., then allowed to cool to room temperature. The mixture was again heated to 100–130° C. to dissolve any unreacted sulfur, and the solvent containing the sulfur was removed by filtration. The S/resin was again washed with 500 cc of 1,2,4-trichlorobenzene at about 100° C., and the solvent was removed by filtration. The washing procedure above was repeated a second time. The S/resin was then washed with about 1 liter of carbon disulfide at reflux and then placed in a chromatographic column and exhaustively chromatographed with carbon disulfide. The recovered dried product (named HGA-1) weighed 57.89 g, indicating that about 16% sulfur had been chemically bound to the resin.

Because of the tedious and expensive nature of the synthesis procedure of Example 1, further improvements on the method of synthesis were devised and are described in the following examples.

EXAMPLE 2

10.0 g of a commercial macroreticular polystyrene resin (Amberlite XAD-4) was mixed with 2.0 g of powdered sulfur, and the mixture was mixed well. Under an atmosphere of flowing nitrogen, the mixture was heated to 180° C. for 24 hrs. Hydrogen sulfide was clearly evident in the effluent gas from the reaction, thus indicating chemical reaction of the sulfur with the resin. The resultant product (named HGA-3) was light brown in color but the particles were not all of the same shade and color. This indicated that although the material had chemically-bound sulfur, not all particles contained the same amount of sulfur.

EXAMPLE 3

2.0 g of elemental sulfur was dissolved in 30 cc of carbon disulfide and 10.0 g of Amberlite XAD-4 was added to the solution. The mixture was heated under vacuum while agitating to remove the solvent. The dry, sulfur impregnated resin was then heated to 165° C. under flowing nitrogen for 90 hrs. to chemically fix the sulfur in active form. Again hydrogen sulfide was noted in the effluent gas. Extraction of the resultant product (named HGA-2) recovered only about 0.4 g of sulfur and the resultant resin contained about 15% bound sulfur. This product was homogeneous in color, as opposed to HGA-3, thus indicating a substantially uniform distribution of sulfur within the particles.

EXAMPLE 4

The preparation of Example 3 was repeated at a higher temperature for shorter time. The sulfur impregnated resin was heated to about 230° C. for about 3 hrs. as above. The resultant product (named HGA-4) contained more bound sulfur than the product of Example 3, (HGA-2), as only about 0.2 g of sulfur could be extracted from the final product. This product was also uniform in color, again indicating that impregnation of sulfur, using a small amount of solvent, prior to chemical reaction leads to uniform distribution of sulfur within the particles.

EXAMPLE 5

A 1/4 inch stainless steel tube of 0.035 inch wall thickness was packed with 0.2 cc of the adsorbent prepared in Example 1 (HGA-1). The condensate was pumped using a positive displacement (ISCO) pump down flow through the adsorbent bed which was maintained at the desired reaction temperature. The reactor pressure was controlled by use of a NUPRO externally adjustable relief valve. Two exemplary condensates were used to test the capacity of HGA-1 to remove mercury. These condensates included a condensate from a field in North Central Germany, having a mercury content of 852 ppb ("German condensate"), and a condensate from a field at Arun, Indonesia, having a mercury content of 220 ppb ("Arun condensate").

The hydrocarbon products were collected and analyzed for mercury content. These results are presented in Table 1. Since the mercury content in the products was so low, the sample size was increased by 5 to 10 fold to improve the sensitivity of mercury analysis. Except for the mercury content, there was no apparent difference in properties between the feed and the product.

TABLE 1

Efficacy of HGA-1 for Hg Removal

| Feed | Hg, ppb |
|---|---|
| German condensate | 852 |
| Arun condensate | 220 |

HGA-1
Started with German condensate

| | Temp. °C. | LHSV v/v Hr | Total Feed B.B. | Hg in ppb | Hg Removal % |
|---|---|---|---|---|---|
| 1 | 250 | 10 | 150 | 0 | 100 |
| 2 | 180 | 10 | 230 | 0 | 100 |
| 3 | 180 | 10 | 460 | 0 | 100 |
| 4 | 180 | 10 | 870 | 0 | 100 |
| 5 | 180 | 25 | 1070 | 0 | 100 |
| 6 | 180 | 25 | 1470 | 0 | 100 |
| 7 | 180 | 25 | 2070 | 0 | 100 |
| 8 | 180 | 25 | 2245 | 0 | 100 |
| 9 | 180 | 25 | 2845 | 0 | 100 |
| | | Change to Arun condensate | | | |
| 10 | 180 | 25 | 3270 | 0 | 100 |
| 11 | 180 | 25 | 3470 | 0 | 100 |
| 12 | 180 | 10 | 3640 | 0 | 100 |
| 13 | 180 | 25 | 4350 | 0 | 100 |
| 14 | 180 | 25 | 4550 | 0 | 100 |
| 15 | 180 | 25 | 4950 | 0 | 100 |
| 16 | 180 | 25 | 5150 | 0 | 100 |
| | | Change to German condensate | | | |
| 17 | 180 | 25 | 5550 | 0 | 100 |
| 18 | 180 | 25 | 6150 | 0 | 100 |
| 19 | 180 | 25 | 7950 | 0 | 100 |

The HGA-1 is effective for removing mercury from both the German and the Arun condensate to levels not detectable using the gold film mercury vapor analyzer (Table 1) Even though the sample sizes were increased 5 to 10 times, the mercury content in the product samples from runs at 180° C. remained too low for the analyzer to detect. The HGA-1 remained effective after about 8000 bed volumes of feed was passed.

EXAMPLE 6

The effect of reaction temperature upon the capacity of an S/resin in accordance with the invention was examined. In this case a German concentrate, having a mercury content of 852 ppb was passed over a sample of HGA-1 (prepared in Example 1). Reaction parameters were as described in Example 5 above, and the temperature was varied as indicated in the summary of results presented in Table 2 below.

TABLE 2

Effect of Temperature on Mercury Removal by HGA-1
Feed: German condensate, 852 ppb Hg

| Temp. °C. | LHSV v/v Hr. | Hg in Prod. ppb | Hg removal % |
|---|---|---|---|
| 180 | 25 | 0 | 100 |
| 120 | 25 | 0 | 100 |
| 100 | 25 | 3 | 99.6 |
| 60 | 25 | 16 | 98.1 |
| 23 | 25 | 78 | 90.8 |

At 23° C., the mercury broke through after 1,000 bed volumes of the condensate was passed over HGA-1 adsorbent. When the temperature was increased to 180° C., the mercury content in the products dropped to zero. The mercury content in the products remained zero after the temperatures were dropped stepwise to 100° C., 80° C. and 60° C. However, after operating for 1,100 bed volumes at 60° C. the mercury broke through again. Raising temperatures stepwise to 100° C. and 120° C., led to a decrease in the mercury content to 3 ppb and 0 ppb, respectively. Since the HGA adsorbent's mercury adsorption performance is not only sensitive to temperature, but is also reversible by varying the temperature, the mechanism of mercury removal is believed to be a chemical reactive adsorption.

When the reaction was carried out at 250° C. as indicated in Table 1, above, the mercury content in the products remained undetectable, but the product became darker suggesting that leaching and/or degradation of the adsorbent is taking place. Based on the results of Examples 5 and 6, the preferred workable temperatures for the reactive adsorbents of the invention are estimated to be in the range of from about 100° C. to about 200° C.

The HGA-1 S/resin is effective for removal for all mercury compounds. The German condensate typically contains refractory mercury compounds, such as $(CH_3)_2Hg$, which are difficult to remove. With typical CuS/C adsorbents, identified for Arun application, the mercury content in the product usually cannot be lowered below 100 ppb. With HGA-1 at 180° C., on the other hand, the mercury content in the products was not detectable.

The efficacy of HGA-1 for removing refractory alkyl mercury compounds is remarkable. The operative mechanism for such efficacy is not well understood, but without desiring to be bound by any one theory, we believe that the polymeric resin base plays key role in concentrating the mercury compounds at locations near the active sulfur, thereby facilitating the reaction.

EXAMPLE 7

Comparative Examples

To show that the new reactive adsorbent materials are superior to the materials of the '968 patent, the following experiments were performed, comparing the performances of a '968 resin and the S/resins of the invention as prepared in Examples 1-3 above. In each case about 0.2 g of the appropriate S/resin was placed in a tubular sorbent column. Condensate was then passed over the S/resin at 200 psig with flow rates of 2 cc/hr (about 10 LHSV) or greater, and at elevated temperatures. The condensate which was contacted with the '968 resin had a mercury content of 960 ppb. The condensate which was contacted with the S/resins of the invention has a mercury content of 852 ppb. Note that the '968 S/resin was a sample of the S/resin prepared as Example 1 of the '968 patent.

TABLE 3

| Adsorbents | LHSV | Temperature (C°) | Hg Detected (ppb) | % Hg Removed | Total Liquid Processed (bed volumes) |
|---|---|---|---|---|---|
| '968 | 10 | 150 | 41 | 96 | 80 |
|  | 10 | 250 | 130 | 86 | 320 |
|  | 10 | 100 | 56 | 94 | 1040 |
| HGA-1 | 10 | 250 | 0 | 100 | 150 |
|  | 10 | 180 | 0 | 100 | 870 |
|  | 25 | 180 | 0 | 100 | 2845 |
| HGA-2 | 25 | 180 | 0 | 100 | — |
| HGA-3 | 25 | 180 | 0 | 100 | — |

From the data shown in Table 3, it is clear that the S/resins of the invention exhibit mercury removal characteristics superior to those of the '968 resin. The S/resins of the invention all removed mercury to levels that were undetectable, while the '968 resin removed no more than 96% of the mercury in the condensate it was used to process. In particular, HGA-1 is shown to be significantly more effective than the '968 resin for removal of mercury both at higher temperatures and at higher liquid hourly space velocities (LHSV). Without wishing to be bound by any theory, the inventors postulate that, in part, this unexpectedly substantial increase in efficiency of adsorption may be attributable to the greater surface area of the support materials of the invention as well as to the improved methods of preparing the reactive adsorbents of the invention.

Although illustrative embodiments of the present invention have been described herein, it is to be understood that the invention is not limited to those precise embodiments, and that various other changes and modifications may be effected therein by one skilled in the art without departing from the scope or spirit of the invention.

What is claimed is:

1. A process for depleting metal contaminants from a hydrocarbon fluid, comprising the steps of: (a) heating an adsorbent, comprising a cross-linked polystyrene resin having a surface area of at least about 200 $m^2/g$ that has been modified by reaction therewith of elemental sulfur, in contact with a hydrocarbon fluid containing a metal contaminant, under conditions for depleting said metal contaminant from said hydrocarbon fluid; and (b) recovering a metal-depleted hydrocarbon fluid.

2. The process of claim 1, wherein said hydrocarbon fluid is natural gas condensate.

3. The process of claim 1, wherein said metal contaminant is mercury.

4. The process of claim 1, wherein said heating step further comprises heating said hydrocarbon fluid with said adsorbent to a temperature of from about 100° C. to about 200° C.

5. The process of claim 1, wherein said heating step further comprises passing a stream of said hydrocarbon fluid through said adsorbent.

6. An adsorbent for depleting metal contaminants from hydrocarbon fluids, prepared by a process of reacting a cross-linked polystyrene resin having a surface area of at least about 200 $m^2/g$ with powdered elemental sulfur.

7. The adsorbent of claim 6, wherein said polystyrene resin has a surface area of about 700 $m^2/g$.

8. The adsorbent of claim 6, wherein said adsorbent contains between about 5 wt. % and 30 wt. % of sulfur.

9. The adsorbent of claim 6, wherein said adsorbent contains between about 10 wt. % and 20 wt. % of sulfur.

* * * * *